Apr. 3, 1923.  
M. R. JACOBUS ET AL  
COLLAPSIBLE POULTRY FEEDER  
Filed Jan. 9, 1923  
1,450,258  
2 sheets-sheet 1
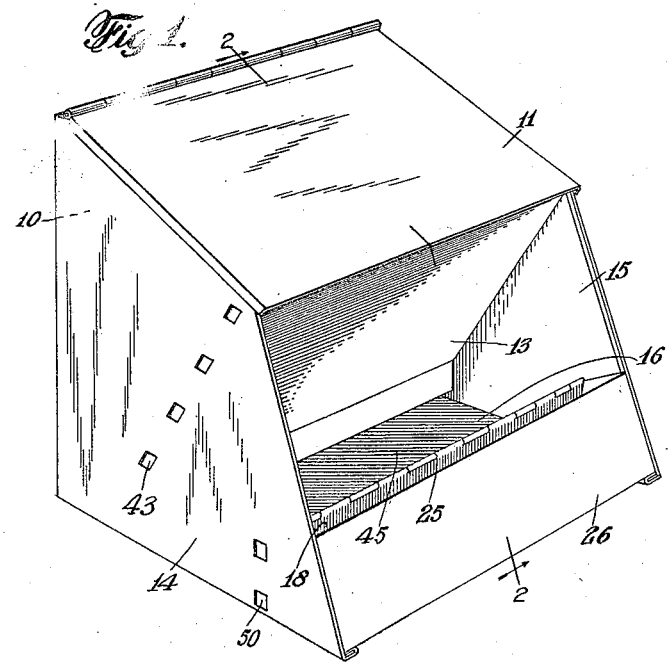
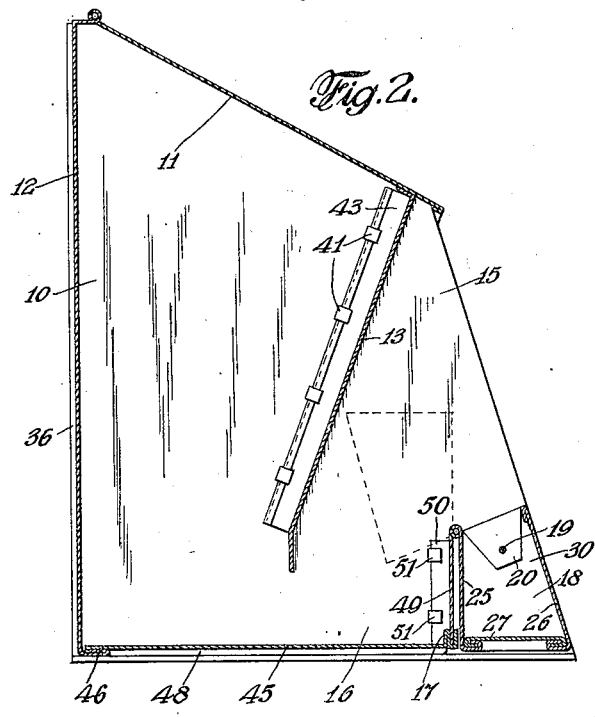
INVENTORS  
Martin R. Jacobus  
William F. Burditt, Jr.  
BY THEIR ATTORNEY Apr. 3, 1923.  1,450,258
M. R. JACOBUS ET AL.
COLLAPSIBLE POULTRY FEEDER
Filed Jan. 9, 1923   2 sheets-sheet 2
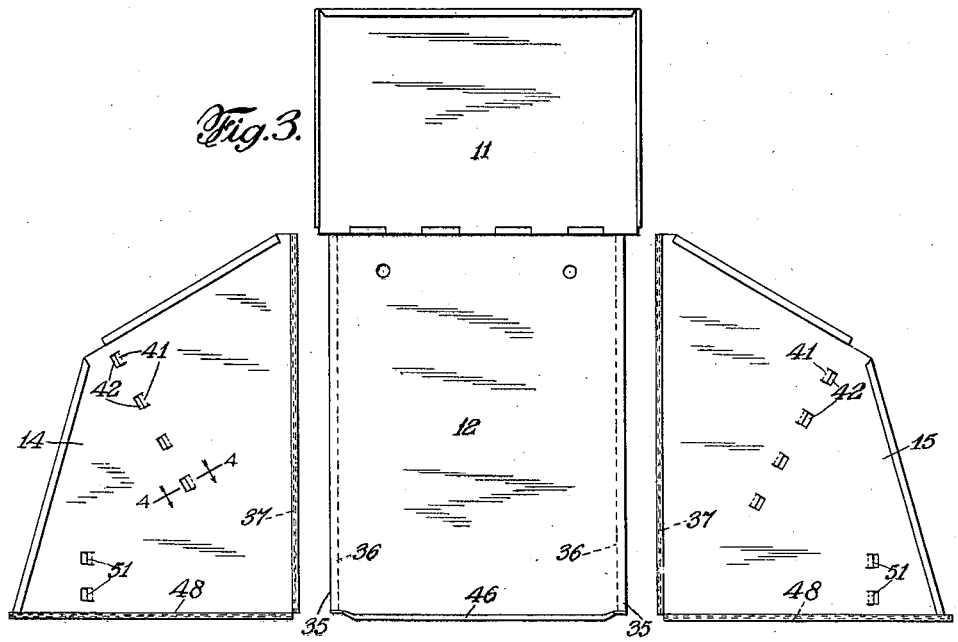
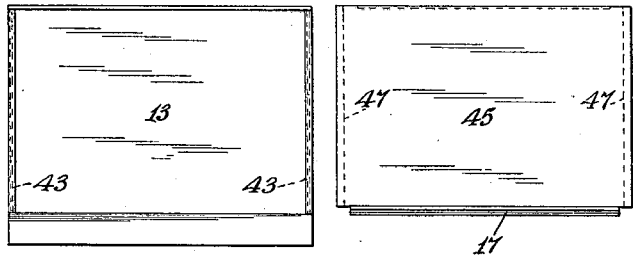
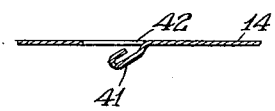
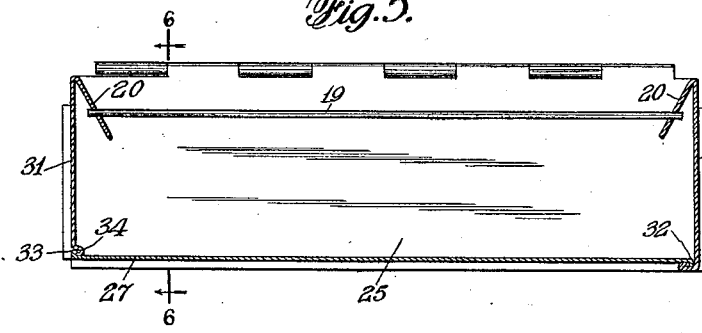
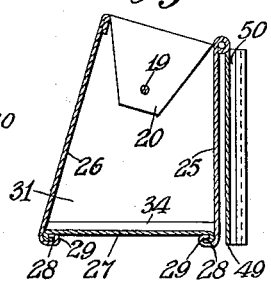
INVENTORS
Martin R. Jacobus
William F. Burditt, Jr.
BY THEIR ATTORNEY Patented Apr. 3, 1923.

1,450,258

UNITED STATES PATENT OFFICE.

MARTIN R. JACOBUS, OF RIDGEFIELD, AND WILLIAM F. BURDITT, JR., OF HILLSIDE, NEW JERSEY; SAID BURDITT ASSIGNOR TO SAID JACOBUS.

COLLAPSIBLE POULTRY FEEDER.

Application filed January 9, 1923. Serial No. 611,575.

*To all whom it may concern:*

Be it known that we, MARTIN R. JACOBUS and WILLIAM F. BURDITT, Jr., citizens of the United States, and residents of Ridgefield and Hillside, respectively, in the counties of Bergen and Union, respectively, and State of New Jersey, have invented certain new and useful Improvements in Collapsible Poultry Feeders, of which the following is a specification.

The invention relates to a feeder for stock as poultry and the like, for example, to a feeder of the type set forth in U. S. Letters Patent No. 1,359,808, granted to M. R. Jacobus, November 23rd, 1920.

It has for its object to provide a feeder which may be readily assembled or taken apart, thus rendering the same conveniently portable and facilitating storage and transportation of the feeder. The improved feeder, moreover, may be more readily and inexpensively manufactured than the type heretofore in general use.

The nature of the invention, however, will best be understood when described in connection with the accompanying drawings, in which—

Figure 1 illustrates, in perspective, the improved feeder.

Fig. 2 is a vertical section therethru taken on the line 2—2, Fig. 1.

Fig. 3 is a disassembled view of the various parts composing the hopper.

Fig. 4 is a detail sectional view, taken on the line 4—4, Fig. 3.

Fig. 5 is a longitudinal section of the waste feed receptacle; and Fig. 6 is a transverse section thereof, taken on the line 6—6, Fig. 5.

Similar characters of reference designate corresponding parts thruout the several views.

Referring to the drawings, more particularly to Figs. 1 and 2 in which the feeder is shown in assembled condition and designed to be formed of metal, preferably galvanized iron, 10 designates a hopper or feeder reservoir which may be closed over at the top by a lid 11 hingedly attached to an offset portion of the back 12 of the feeder. The hopper is completed by an assembling partition or wall 13 which is removably secured between the two sides 14 and 15 of the feeder; and the said partition is directed rearwardly to form a downwardly-tapering hopper. The partition 13 does not, however, extend entirely to the bottom but provides sufficient opening for delivering feed to a feed receptacle 16 at the forward portion of the feeder. The said partition may serve, also, to afford an abutment in connection with the closing of the feeder against vermin, as will hereinafter be more fully set forth. In front of the receptacle 16, and extending along its length, there may be arranged between the sides and movable in relation thereto, as in being secured to the top of an upstanding portion 17 of the bottom, a collapsible waste receptacle 18. This receptacle is designed to catch any food thrown or dropped in eating from the receptacle 16 behind same. The upstanding portion 17 may be formed by a double fold of the material at the forward edge of the bottom piece, serving to provide a suitable recess for receiving and sustaining the connecting portion of the receptacle 18; or if of sufficient height, as the front wall of receptacle 16. At its rear end, the edge of said bottom piece is turned slightly downwardly substantially at right angles to the bottom for locking to the back, as hereinafter set forth.

In order to prevent access by an animal or fowl to the contents of the waste receptacle 18, as received in feeding from the feed receptacle 16, the former is shown provided at its top with a suitable grating which may comprise a single rod or wire 19, and the ends of which are shown supported by inwardly turned apertured ears or lugs 20 of the sides of the waste receptacle.

The receptacle 18 is designed to be hingedly connected to the receptacle 16 so that any waste food recovered may be readily returned from the waste receptacle to the feed receptacle by merely turning the former and inverting same over the latter; and if brought far enough to bear against the partition 13, as to the position indicated in dotted lines, Fig. 2, the waste receptacle will close off the feeder and secure the contents of same against vermin, as well as to prevent the stock feeding therefrom.

Receptacle 18 may be constructed as shown in the said prior patent; but it is preferred to make same collapsible so that it may more conveniently be packed with the rest of the hopper, as for shipment or storage. To this end, the back wall 25 thereof has its lower edge turned inwardly and then lapped over upon itself, and similarly the side edges. The front wall 26 is likewise constructed with respect to its bottom and side edges; and the bottom piece 27 is turned inwardly over its under face at the front and rear edges, the turned-in portions 28 being designed to fit within the corresponding channels 29 provided by the front and rear walls. In like manner, the side pieces 30 and 31 are removably secured to the front and rear walls. However, at one end, the bottom piece 27 is provided with a downwardly turned lip 32 to lock behind the lapped over lower end of the corresponding side piece 30; while at the other end, the bottom is turned upwardly and inwardly to provide a lip 33 fitting into a channel 34 formed by folding upon itself the lower edge of the other side piece 31. In assembling the waste receptacle, the bottom piece is slid into the channels 29 of the front and rear pieces, whereupon the side piece 30 is locked into place, and finally the side piece 31. The rod 19 is then sprung into place between the lugs 20.

For assembling the hopper, the back 12 has strips or portions 35 thereof turned inwardly over the outer face and along the respective side edges to provide corresponding channels 36. Into these channels are designed to slide lapped over portions 37 of turned-in strips extending at right angles from the rear edges of the respective sides 14 and 15. To complete the assembly of the hopper, the partition wall 13 is arranged to slide in position between the two sides 14 and 15 between the front and rear edges of the said sides. This is conveniently accomplished by providing, along the inner face of each side a series of holding guides disposed over the said sides at the proper angle to afford a rearwardly directed and downwardly tapering hopper. The guides are formed from the sides by cutting out lips 41 therefrom, the same being inwardly directed and the edge lapped over. Moreover, the openings 42 in the sides resulting from the cutting out of the lips 41 are to be closed when the partition 13 is inserted by having strips or portions 43 extend outwardly from and at right angles to the said partition, the respective edges thereof, furthermore, being turned or lapped over to fit in the guides provided by the lips 41. This arrangement improves greatly the appearance of the hopper and prevents the entrance into the interior of foreign matter thru the openings and loss of food from the interior. Moreover, the extent of feed opening from the hopper may be varied by correspondingly adjusting the said partition 13.

The bottom piece 45 is arranged to lock at the back edge, which is turned down as set forth, by dropping in back of an overlapped portion 46 at bottom of the back 12 and extending inwardly therefrom; and is slid into place thru engagement of its turned under edges 47 with channels 48 along the bottom edges of the sides 14 and 15. The waste receptacle 18 is then attached to the upstanding portion 17 thru a piece 49, hingedly secured to the back 25 of said waste receptacle. This piece has extending portions 50, the turned over side edges of which also engage guides 51, similar to the guides 41, along the corresponding sides 14 and 15.

We claim:—

1. A feeder, comprising metal back, bottom and side plates removably connected to one another, and a removable metal partition to retain said plates together and to form a hopper therewith.

2. A feeder, comprising metal back and side plates, a metal bottom plate removably attached thereto, an upstanding portion along its front, and a removable metal partition to retain said plates together and form a hopper therewith.

3. A feeder, comprising metal back, bottom and side plates removably connected to one another, a removable metal partition to retain said plates together and to form a hopper therewith, and a waste receptacle removably attached to the hopper and movable relatively thereto.

4. A feeder, comprising metal back, bottom and side plates removably connected to one another, a removable metal partition to retain said plates together and to form a hopper therewith, and a collapsible metal waste receptacle removably attached to the bottom plate and movable relatively to the hopper.

5. A feeder, comprising metal back, bottom and side plates removably connected to one another, the bottom plate having an upstanding portion along its front, a collapsible metal waste receptacle supported by the upstanding portion, and a removable metal partition to retain said plates together and form a hopper therewith.

6. A feeder, comprising metal back, bottom and side plates removably connected to one another, the bottom plate having an upstanding portion along its front, a collapsible metal waste receptacle removably supported by the upstanding portion and locked to the sides, and a removable metal partition to retain said plates together and form a hopper therewith.

7. A feeder comprising, metal back, bottom and side plates removably connected to one another, the back having at the bottom an upstanding edge to receive a downwardly turned edge at the inner end of the bottom to lock the latter plate against withdrawal, and a removable metal partition to retain said plates together and form a hopper therewith.

8. A feeder comprising, a metal back plate, metal side plates having lips cut therefrom, inwardly directed and with edge thereof turned over to provide guides, a metal bottom plate, and a metal partition removably fitting in the guides of the sides to retain all of said plates together and form a hopper therewith.

9. A feeder comprising a metal back plate, metal side plates having lips cut therefrom, inwardly directed and with edge thereof turned over to provide guides, a metal bottom plate adapted to fit the bottom of the back plate and to be locked to the side plates, and a metal partition removably fitting in the guides of the sides to retain all of said plates together and form a hopper therewith.

10. A feeder, comprising a metal back plate, metal side plates having lips cut therefrom, inwardly directed with edges turned over to provide guides, a metal bottom plate, and a metal partition having portions along its sides extending at right angles to the partition, said portions having their edges lapped over and the respective lapped over edges being adapted to fit the guides provided by the said lips and the extending portions of the partitions to then close the openings in the sides resulting from the cut-out lips.

11. In a receptacle having opposite sides with lips cut therefrom to provide guides: a uniting wall for the sides having extending portions adapted to fit said guides and to close the openings in the sides resulting from the cut-out lips.

Signed at Elizabeth, in the county of Union and State of New Jersey, this 30th day of December, A. D. 1922.

MARTIN R. JACOBUS.
WILLIAM F. BURDITT, Jr.